United States Patent
Hachtmann et al.

(10) Patent No.: US 9,211,951 B2
(45) Date of Patent: Dec. 15, 2015

(54) SYSTEMS AND APPARATUS FOR TETHER TERMINATION MOUNT FOR TETHERED AERIAL VEHICLES

(71) Applicant: Google Inc., Mountain View, CA (US)

(72) Inventors: Brian Hachtmann, San Martin, CA (US); Corwin Hardham, Mountain View, CA (US); Damon Vander Lind, Alameda, CA (US); Rob Nelson, Alameda, CA (US)

(73) Assignee: Google Inc., Mountain View, CA (US)

( * ) Notice: Subject to any disclaimer, the term of this patent is extended or adjusted under 35 U.S.C. 154(b) by 118 days.

(21) Appl. No.: 14/102,483

(22) Filed: Dec. 10, 2013

(65) Prior Publication Data

US 2015/0158585 A1    Jun. 11, 2015

(51) Int. Cl.
| | | |
|---|---|---|
| *A63H 27/08* | (2006.01) | |
| *B64C 39/02* | (2006.01) | |
| *B64F 3/02* | (2006.01) | |
| *H01R 39/64* | (2006.01) | |
| *B64F 3/00* | (2006.01) | |
| *F03D 11/04* | (2006.01) | |
| *F03D 5/00* | (2006.01) | |

(52) U.S. Cl.
CPC .............. *B64C 39/022* (2013.01); *B64F 3/00* (2013.01); *B64F 3/02* (2013.01); *F03D 5/00* (2013.01); *F03D 11/04* (2013.01); *H01R 39/64* (2013.01); *B64C 2201/021* (2013.01); *B64C 2201/148* (2013.01); *F05B 2240/917* (2013.01); *F05B 2240/921* (2013.01); *F05B 2240/923* (2013.01)

(58) Field of Classification Search
USPC ..... 244/153 R, 155 R, 158.2, 1 R; 290/55, 44
See application file for complete search history.

(56) References Cited

U.S. PATENT DOCUMENTS

| | | | | |
|---|---|---|---|---|
| 4,166,596 | A | * | 9/1979 | Mouton et al. ................. 244/30 |
| 4,251,040 | A | | 2/1981 | Loyd |
| 4,491,739 | A | * | 1/1985 | Watson .......................... 290/44 |
| 4,832,571 | A | * | 5/1989 | Carrol ....................... 416/132 B |
| 6,254,034 | B1 | | 7/2001 | Carpenter |
| 6,523,781 | B2 | * | 2/2003 | Ragner .................... 244/153 R |

(Continued)

FOREIGN PATENT DOCUMENTS

WO    2010134997    11/2010

OTHER PUBLICATIONS

PCT International Search Report, International application No. PCT/US2014/069146, International filing date Dec. 8, 2014, (5 pages).

*Primary Examiner* — Christopher P Ellis
(74) *Attorney, Agent, or Firm* — McDonnell Boehnen Hulbert & Berghoff LLP.

(57) ABSTRACT

Wind energy systems, such as an Airborne Wind Turbine ("AWT"), may be used to facilitate conversion of kinetic energy to electrical energy. An AWT may include an aerial vehicle that flies in a path to convert kinetic wind energy to electrical energy. The aerial vehicle may be tethered to a ground station with a tether that terminates at a tether termination mount. In one aspect, the tether may be a conductive tether that can transmit electricity and/or electrical signals back and forth between the aerial vehicle and the ground station. The tether termination mount may include one or more gimbals that allow for the tether termination mount to rotate about one or more axis. In a further aspect, the tether termination mount may include a slip ring that allows for rotation of the tether without twisting the tether.

20 Claims, 6 Drawing Sheets

(56) References Cited

U.S. PATENT DOCUMENTS

| | | | |
|---|---|---|---|
| 7,275,719 B2* | 10/2007 | Olson | 244/155 A |
| 7,317,261 B2* | 1/2008 | Rolt | 290/55 |
| 8,319,368 B2* | 11/2012 | Ippolito et al. | 290/55 |
| 8,350,403 B2* | 1/2013 | Carroll | 290/55 |
| 8,800,931 B2* | 8/2014 | Vander Lind | 244/154 |
| 8,888,049 B2* | 11/2014 | Vander Lind | 244/153 R |
| 2010/0230546 A1 | 9/2010 | Bevirt et al. | |
| 2011/0101692 A1 | 5/2011 | Bilaniuk | |
| 2011/0121570 A1 | 5/2011 | Bevirt et al. | |
| 2011/0180667 A1 | 7/2011 | O'Brien et al. | |
| 2012/0068013 A1* | 3/2012 | Affre De Saint Rome | 244/115 |
| 2013/0221679 A1 | 8/2013 | Vander Lind | |
| 2015/0076289 A1* | 3/2015 | Chubb et al. | 244/76 R |

* cited by examiner

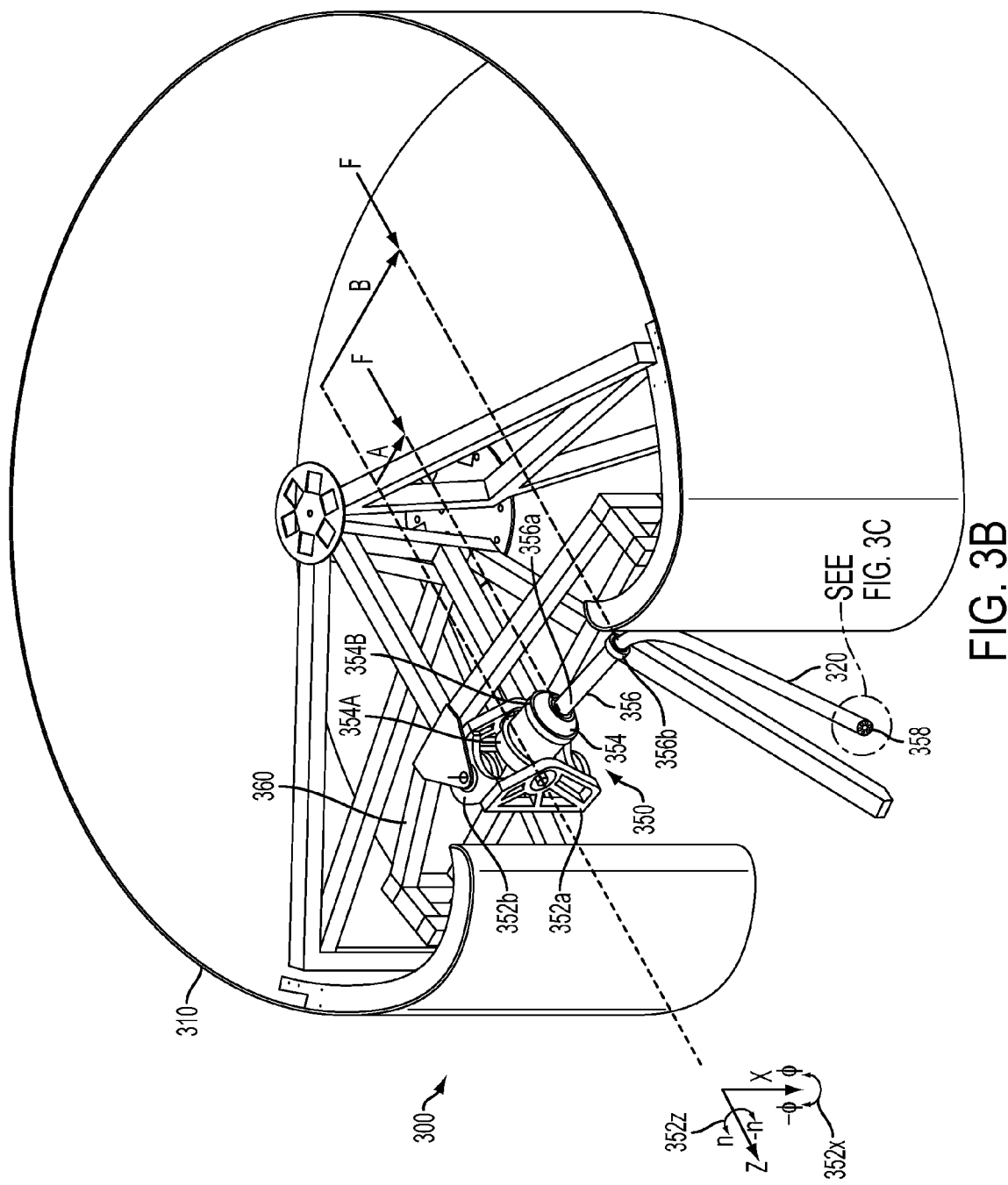

SYSTEMS AND APPARATUS FOR TETHER TERMINATION MOUNT FOR TETHERED AERIAL VEHICLES

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

The present disclosure generally relates to systems and methods that incorporate a ground station for tethering aerial vehicles such as those employed in crosswind aerial vehicle systems. Crosswind aerial vehicle systems may extract useful power from the wind for various purposes such as, for example, generating electricity, lifting or towing objects or vehicles, etc. Deploying and receiving the aerial vehicles to generate power may present difficulties due to, for example, changing wind conditions and/or turbulent wind conditions. Beneficially, embodiments described herein may allow for more reliable, safe, and efficient deployment and reception of aerial vehicles. These as well as other aspects, advantages, and alternatives will become apparent to those of ordinary skill in the art by reading the following detailed description, with reference where appropriate to the accompanying drawings.

In one aspect, a tether termination mount is provided. The tether termination may include a gimbal system. The gimbal system may include a first gimbal with a primary bearing system and configured for movement substantially about a primary axis. The gimbal system may further include a second gimbal with a secondary bearing system and configured for movement substantially about a second axis. The tether termination mount may include a slip ring with a stationary portion and a rotatable portion. The stationary portion of the slip ring may be coupled to the second gimbal and may be electrically coupled to the rotatable portion of the slip ring. The rotatable portion of the slip ring may be electrically coupled to a tether containing one or more insulated conductors. The tether termination mount may further include a spindle. The spindle may include a proximate spindle end and a distal spindle end. The spindle may be configured to constrain a portion of the tether. The proximate spindle end may be coupled to the rotatable portion of the slip ring.

In another aspect, a tether termination mount capable of reporting position and/or velocity data is provided. The tether termination may include a gimbal system. The gimbal system may include a first gimbal with a primary bearing system and a primary encoder. The first gimbal may be configured for movement substantially about a primary axis. The gimbal system may further include a second gimbal with a secondary bearing system and a secondary encoder. The second gimbal may be configured for movement substantially about a second axis. The tether termination mount may include a slip ring with a stationary portion and a rotatable portion. The stationary portion of the slip ring may be coupled to the second gimbal and may be electrically coupled to the rotatable portion of the slip ring. The rotatable portion of the slip ring may be electrically coupled to a tether containing one or more insulated conductors. The tether termination mount may further include a spindle. The spindle may include a proximate spindle end and a distal spindle end. The spindle may be configured to constrain a portion of the tether. The proximate spindle end may be coupled to the rotatable portion of the slip ring.

In another aspect, a system is provided. The system may include a tether with a proximate tether end, a main tether body, and a distal tether end. The distal tether end may be connected to an aerial vehicle. The tether may include one or more insulated electrical conductors. The one or more conductors may each have a proximate conductor end and a distal conductor end. The distal conductor end may be coupled to the aerial vehicle. The system may also include a gimbal system with an altitude axis gimbal and an azimuth axis gimbal. The altitude axis gimbal may include an altitude bearing system and an altitude encoder and may be configured for movement substantially about an altitude axis. The azimuth axis gimbal may include an azimuth bearing system and an azimuth encoder and may be configured for movement substantially about an azimuth axis. The system may further include a slip ring with a stationary portion and a rotatable portion. The stationary portion of the slip ring may be coupled to the azimuth axis gimbal and may be electrically coupled to the rotatable portion of the slip ring. The rotatable portion of the slip ring may be electrically coupled to the tether via the proximate conductor end of the one or more conductors. The system may include a servomotor that is coupled to the slip ring and configured to rotate the slip ring in response to rotation of the tether. The system may further include a spindle with a proximate spindle end and a distal spindle end. The spindle may be configured to constrain a portion of the main tether body. The proximate spindle end may be coupled to the rotatable portion of the slip ring.

BRIEF DESCRIPTION OF THE DRAWINGS

FIG. 3B illustrates a perspective view of a ground station for an aerial vehicle of an AWT.

DETAILED DESCRIPTION

Figure 1:
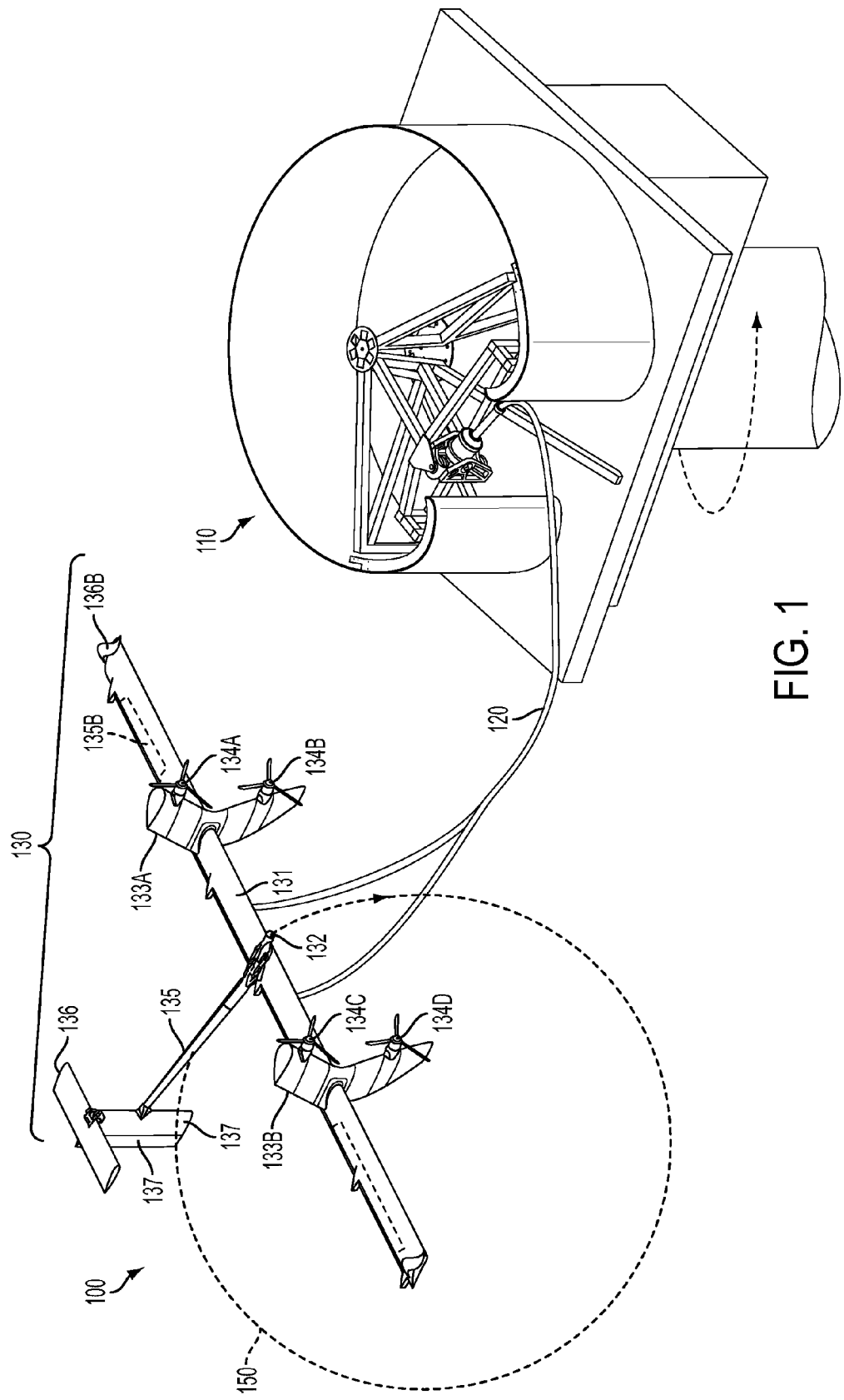
FIG. 1 illustrates an Airborne Wind Turbine (AWT), according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments relate to aerial vehicles, which may be used in a wind energy system, such as an Airborne Wind Turbine (AWT). In particular, example embodiments may relate to or take the form of methods and systems for facilitating an aerial vehicle in the process of conversion of kinetic energy to electrical energy.

By way of background, an AWT may include an aerial vehicle that flies in a path, such as a substantially circular path, to convert kinetic wind energy to electrical energy via onboard turbines. In an example embodiment, the aerial vehicle may be connected to a ground station via a tether. While tethered, the aerial vehicle may: (i) fly at a range of elevations and substantially along the path, and return to the ground, and (ii) transmit electrical energy to the ground station via the tether. In some embodiments, the ground station may transmit electricity to the aerial vehicle for take-off and/or landing.

In an AWT, an aerial vehicle may rest in and/or on a ground station when the wind is not conducive to power generation. When the wind is conducive to power generation, such as when a wind speed may be 10 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some embodiments, the aerial vehicle may vertically ascend or descend in hover flight.

In crosswind flight, the aerial vehicle may be propelled by the wind substantially along a path, which as noted above, may convert kinetic wind energy to electrical energy. In some embodiments, the one or more propellers of the aerial vehicle may generate electrical energy by slowing down the incident wind.

The aerial vehicle may enter crosswind flight when (i) the aerial vehicle has attached wind-flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station.

Some previous tethered systems have used a varying length tether. An example embodiment, in contrast, facilitates the use of a fixed length tether. For example, a fixed length tether may be approximately 500 meters long and approximately 20 millimeters in diameter. The tether may include one or more insulated conductors to transmit electrical energy, or other electrical signals, along the tether length.

A tether termination mount at the ground station may be desirable for various reasons. For example, the aerial vehicle in cross-wind flight may oscillate many times over the life of the system (for e.g., 30 million cycles of aerial vehicle and tether rotation) so a tether termination mount may be desirable that does not wear, or rub, the tether. In the case of rigid or semi-rigid tethers, a tether termination mount may be desirable that does not impart significant bending loads onto the tether.

In the case of a tether with one or more conductors, a tether termination mount may be desirable that does not accumulate twists in the tether. Tether twisting may be a problem because a twisted tether may have reduced conductivity due to the twisting or eventual breaking of the conductor(s). For example, the tether termination mount may either actively or passively rotate to align the tether at the ground-side system with the motion of the aerial vehicle. The tether termination mount may include a servomotor or other drive mechanism to manually rotate the tether and reduce the likelihood of significant tether twisting. Additionally in the case of a tether with one or more conductors, a tether termination mount may be desirable that communicates power either into the ground side system or out to the aerial vehicle.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while transitioning between hover and crosswind flight.

In addition, the ground station 110 may include one or more components (not shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters. However other lengths may be used as well.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors that may be spaced along main wing 131.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
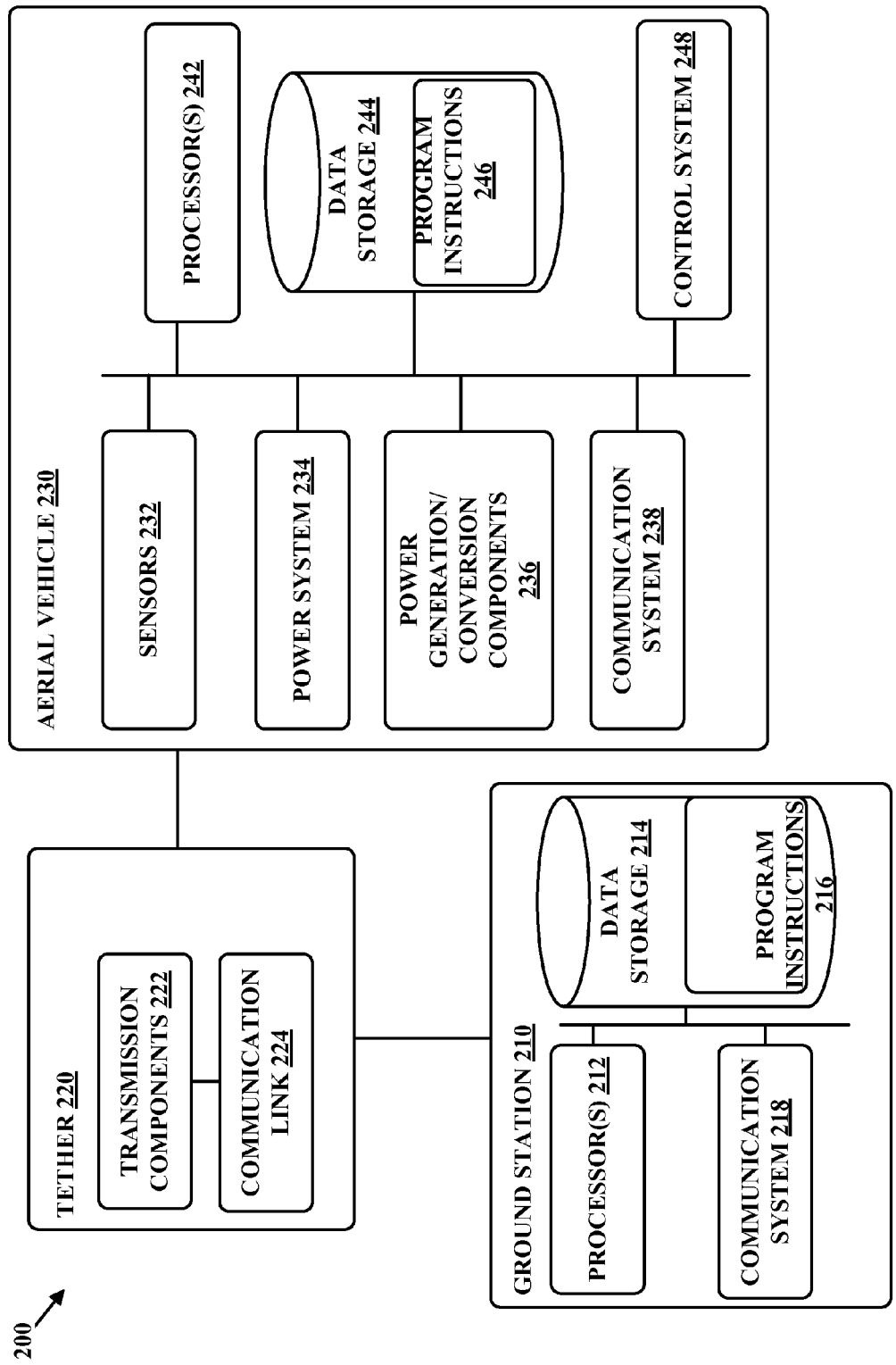
FIG. 2 illustrates a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more insulated conductors that are configured to transmit electricity. And in at least one such example, the one or more conductors may include aluminum and/or any other material which may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a Nano-ElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. For example, vehicle 230 may employ drift mitigation through fault tolerant redundant position and velocity estimations. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power in wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable vehicle that is connected to a tether, such as the tether 230 and/or the tether 110.

C. Illustrative Components of a Ground Station

Figure 3A:
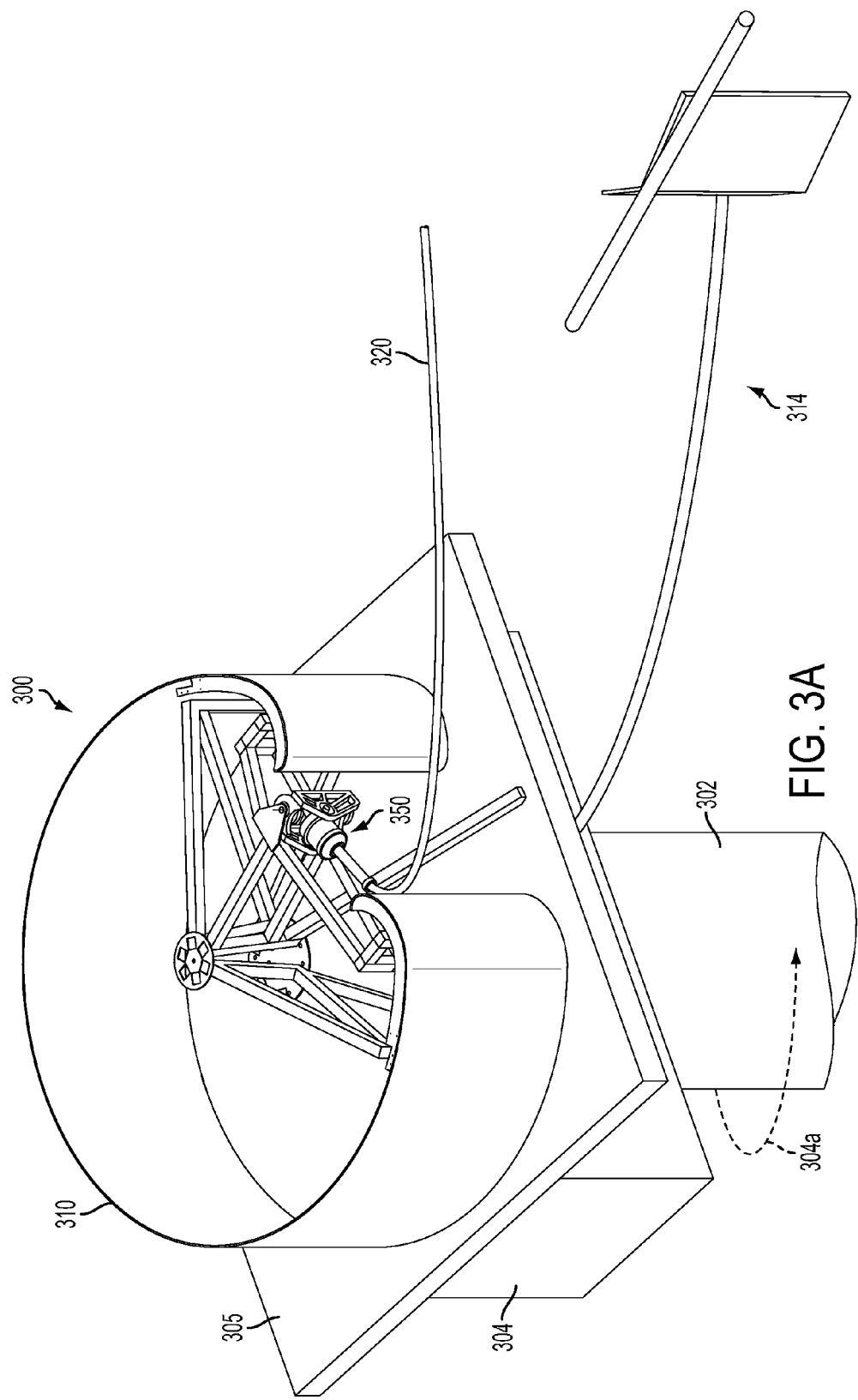
FIG. 3A illustrates a perspective view of a ground station for an aerial vehicle of an AWT.

FIG. 3A illustrates a perspective view of a ground station for an aerial vehicle of an AWT, such as the aerial vehicle 130 illustrated in FIG. 1. The ground station 300 may be the same or similar to ground station 210 of FIG. 2, or ground station 110 of FIG. 1. FIG. 3A is representational only and not all components are shown. For example, additional structural or restraining components may not be shown.

Ground station 300 may include vertical tower 302, platform 305, winch assembly 306, tether termination mount 350, and perch assembly 314. Tower 302 and platform 305 may be used to facilitate the perch and launch of an aerial vehicle, such as aerial vehicle 130 of the AWT illustrated in FIG. 1. In some embodiments, platform 305 may be a perch platform upon which an aerial vehicle, such as aerial vehicle 130, can perch (e.g., when landing).

Ground station 300 may also include a winch drum 310 and winch assembly (not shown), both of which may be coupled to platform 305. Platform 305 may be coupled to a rotating member 304 and thereby rotatably coupled to vertical tower 302. Via rotating member 304, winch assembly, winch drum 310, and platform 305 may rotate around an axis such as around a vertical axis (e.g., rotate in the azimuth plane). Rotating member 304 may be, for example, a passive slewing ring or an active slewing ring with a motor drive. In this manner, platform 305 may be rotated actively or passively around a vertical axis (representatively shown in FIG. 3A by arrow 304a). While disclosed embodiments make use of a slewing ring, any rotational bearing or other configuration may be used that may allow platform 305 to rotate around tower 302. Tower 302 may be a tubular steel structure, although any structure that can resolve aerial flight loads may be used.

Tether 320 may be connected to ground station 300 via tether termination mount 350 and wound onto winch drum 310 when winch drum rotates. Tether 320 may include a distal tether end connected to an aerial vehicle of an AWT, a main tether body, and a proximate tether end. Tether 320 may include one or more insulated conductors that have a proximate conductor end and a distal conductor end that is coupled to the aerial vehicle of an AWT. The distal conductor end may be coupled to the aerial vehicle of an AWT. The tether termination mount 350 may be coupled to the winch drum 310 in various ways. For example, the tether termination mount may be connected to a support structure 360 that is connected to the winch drum 310. The tether 320 may be guided onto winch drum 310 via a levelwind (not shown).

Advantageously, platform 305 (and winch assembly including winch drum 310) may rotate in response to bias pressure applied by tether 320 to tether termination mount 350. For example, if an AWT attached to tether 320 changes its azimuth angle relative to winch drum 310 (or platform 305), tether 320 may apply bias pressure to tether termination mount 350, which may in turn cause platform 305 to rotate passively towards the bias direction.

Alternatively or additionally, tether termination mount 350 may include sensors to detect bias pressure applied by tether 320 to tether termination mount 350. The sensors may be pressure sensors, force sensors, vibrational sensors, or any other sensors configured to detect bias pressure. In response to detecting bias pressure, a motor (not shown) or other active component may then cause platform 305 to rotate relative to tower 302 and in the direction of the bias. Allowing or causing platform 305 and winch assembly to rotate around tower 302 and to face a tension force applied by tether 320 is advantageous because it may, among other advantages, reduce side loading forces and other undesirable forces acting on components of ground station 300.

D. Illustrative Components of a Tether Termination Mount

FIG. 3B illustrates a perspective view of a ground station for an aerial vehicle of an AWT, such as the aerial vehicle 130 illustrated in FIG. 1. The ground station 300 may be the same or similar to ground station 300 for FIG. 3A, ground station 210 of FIG. 2, or ground station 110 of FIG. 1. FIG. 3B is representational only and not all components are shown. For example, additional structural or restraining components may not be shown.

As illustrated in FIG. 3B, tether termination mount 350 may be coupled to the winch drum 310 and may include one or more gimbals, for example gimbals 352A and 352B, a slip ring 354, and a spindle 356. Each gimbal, such as gimbals 352A and 352B, may be a structural support that allows the tether termination mount 350 to rotate about an axis. In an example embodiment, the tether termination mount 350 may have two gimbals 352A and 352B that allow the tether termination mount 350 to rotate about two axes. For example, gimbal 352A may be configured to allow the tether termination mount 350 to rotate about a primary axis, such as an altitude axis or a z-axis with a range of angles η to −η (representatively shown in FIG. 3B as arrow 352z, for the current orientation of the tether termination mount). Additionally, gimbal 352B may be configured to allow the tether termination mount 350 to rotate about a secondary axis, such as an azimuth axis or an x-axis, with a range of angles φ to −φ (representatively shown in FIG. 3B as arrow 352x, for the current orientation of the tether termination mount). In FIG. 3B, gimbals 352A and 352B are shown with rotational axes oriented perpendicular to each other; however, the primary and secondary axes may be aligned at some orientation other than perpendicular. Also, gimbals 352A and 352B may additionally or alternatively be configured to rotate without limitation as to the range of angles (i.e., a gimbal could rotate completely about its axis) or with varying limits to the range of angles. Additionally, there may be more or less than two gimbals in the system.

Each gimbal 352A and 352B may include a bearing system. The bearing system may advantageously have a low overturning moment to allow for easy rotation. In an example embodiment, the bearing system includes two radial bearings, with one bearing located near each end of gimbal system. Each gimbal 352A and 352B may further include an encoder, such as a rotary encoder. The encoder may provide feedback related to speed, motion, and/or position of the gimbal about its axis of rotation.

The tether termination mount 350 may include a slip ring 354 that includes a stationary portion 354A and a rotatable portion 354B. The slip ring may be any electromechanical device that allows transmission of power and electrical signals from a rotating structure to a stationary structure, and may be used during unrestrained, intermittent or continuous rotation.

Figure 3C:
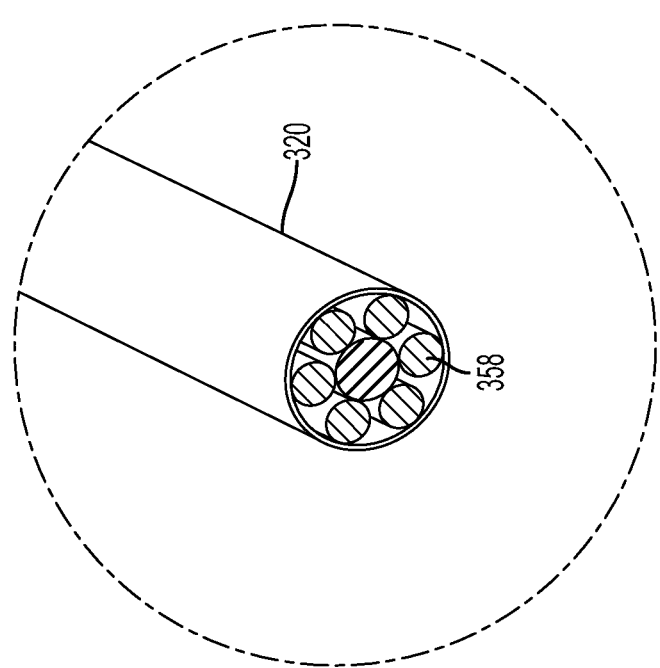
FIG. 3C illustrates a cross-sectional view of a tether with insulated electrical conductors, according to an example embodiment.

As illustrated in FIG. 3B, the slip ring 354 may be directly connected to the tether termination mount 350. For example, the stationary portion 354A of slip ring 354 may be mechanically coupled to gimbal 352A. The stationary portion 354A may further be electrically coupled to the rotatable portion 354B, which in turn may be electrically coupled to the tether 320, thereby allowing the tether 320 to rotate while still communicating power and/or electrical signals to the ground station 300. For example, the proximate conductor end of one or more insulated conductors 358 included in tether 320 may be electrically coupled to the rotatable portion 354B of the slip ring 354. FIG. 3C illustrates an enlarged cross-sectional view of tether 320 and one or more insulated conductors 358. Slip ring 354 may be rotated actively (e.g., with a servomotor) or rotated passively (e.g., with potential energy stored by the action of a rotating tether in a torsion spring).

The tether termination mount may also include a spindle 356. The spindle 356 may be a length of housing that extends from the tether termination mount 350 and which the tether 320 passes through or is fixed along. The spindle 356 may have two ends, a proximate spindle end 356a and a distal spindle end 356b.

The proximate spindle end 356a may be attached to the tether termination mount 350. The distal spindle end 356b may extend towards the distal point of the tether for some distance. The distal spindle end 356b may include a bearing system, for example, a radial bearing, which may be used to accommodate rotation of the tether 320 within or about the spindle 356.

In a further aspect, the spindle 356 may help to reduce bending loads on portions of the tether termination mount 350, such as on the gimbals 352A and 352B and/or slip ring 354. For example, if the tether 320 is connected to an aerial vehicle of an AWT in cross-wind flight, the tether 320 may act as a bending load on those, and other, portions of the tether termination mount 350. The spindle 356 may extend the point of contact of the tether 320 on the tether termination mount 350. For example, FIG. 3B illustrates a spindle 356 extending the point of contact of the tether 320 on the tether termination mount 350 by the distance from 356a to 356b. Consequently, the spindle 356 may also increase the leverage the tether 320 has on the tether termination mount 350, which in turn may advantageously help to increase the ability of the tether termination mount 350 to turn and follow the tether 320. As shown in FIG. 3B, the spindle 356 acts as a lever and applies greater leverage from the tether 320 to the tether termination mount 350 than would exist without the spindle 356.

For example, with a tether termination mount that did not include a spindle, a bias pressure from the tether would apply a relatively low amount of rotational torque to the tether termination mount about one or more of the gimbal axes. For example, against an exemplary axis, a biased tether may apply a force vector F at a distance against the tether termination mount, where A may be the displacement vector from where the torque is measured to the point where the force is applied. The torque, $T_1$, may be calculated as the cross product of vectors F and A. ($T_1 = A \times F$, where × denotes the cross product).

In contrast, a tether termination mount 350 that does include a spindle 356 will necessarily experience a larger torque for the same applied tether force F at a distance vector greater than A. For example, as shown in FIG. 3B, if the applied tether force F is applied at the distal tether end 356b, where B may be the displacement vector from where the torque is measured to the point where the force is applied (where B is greater than A), the resulting torque $T_2$ may be calculated as the cross product of vectors F and B. ($T_2$=B×F, where × denotes the cross product). Since the displacement vector B has a magnitude larger than displacement vector A, the resulting torque $T_2$ applied to the tether termination mount 350 will always have a larger magnitude than the torque $T_1$ that would be applied to the tether termination mount 350 where a spindle 356 is not utilized.

Additionally or alternatively, the spindle 356 may help align the tether 320 and the tether termination mount 350, which in turn may advantageously help to reduce the likelihood of binding forces on the bearings of the tether termination mount 350. For example, a tether 320 may follow a path 370 when used with a tether termination mount 350 that does not include a spindle 356. In contrast, a tether 320 may follow a path 372 when used with a tether termination mount 350 that includes a spindle 356 as illustrated in FIG. 3B. Path 372 has a longer length of tether 320 that is collinear with an axis of the tether termination mount 350. For example, as shown in FIG. 3B, path 372 has a tether length B that is aligned with the y-axis of the tether termination mount 350. In comparison, path 370 only has a tether length A that is aligned with the y-axis of the tether termination mount. This alignment of the tether 320 with an axis of the tether termination mount 350 is advantageous because it may help to reduce possible binding forces on the tether termination mount, for example, the alignment along the y-axis may help to reduce possible binding forces on the axis bearings of the one or more gimbals 352.

Additionally or alternatively, the distal spindle end 356b may include a sensor (e.g., a force sensor such as a strain gauge or a load cell). For example, a force sensor may be used to determine the force of the tether 320 against the distal spindle end 356b. This force may be used to determine whether to actively rotate a portion of the ground station 300. For example, if the determined force of the tether 320 against the distal spindle end 356b is above a threshold, the winch assembly may actively rotate the winch drum 310 in a direction to reduce force. To help accommodate elongation of the tether 320 when the tether 320 is loaded, the tether 320 may be allowed to slide within or along the sensor.

FIG. 3C illustrates a cross-section view of a tether with insulated electrical conductors, according to an example embodiment. Tether 320 may have one or more insulated electrical conductors 358 as previously described.

Figure 4:
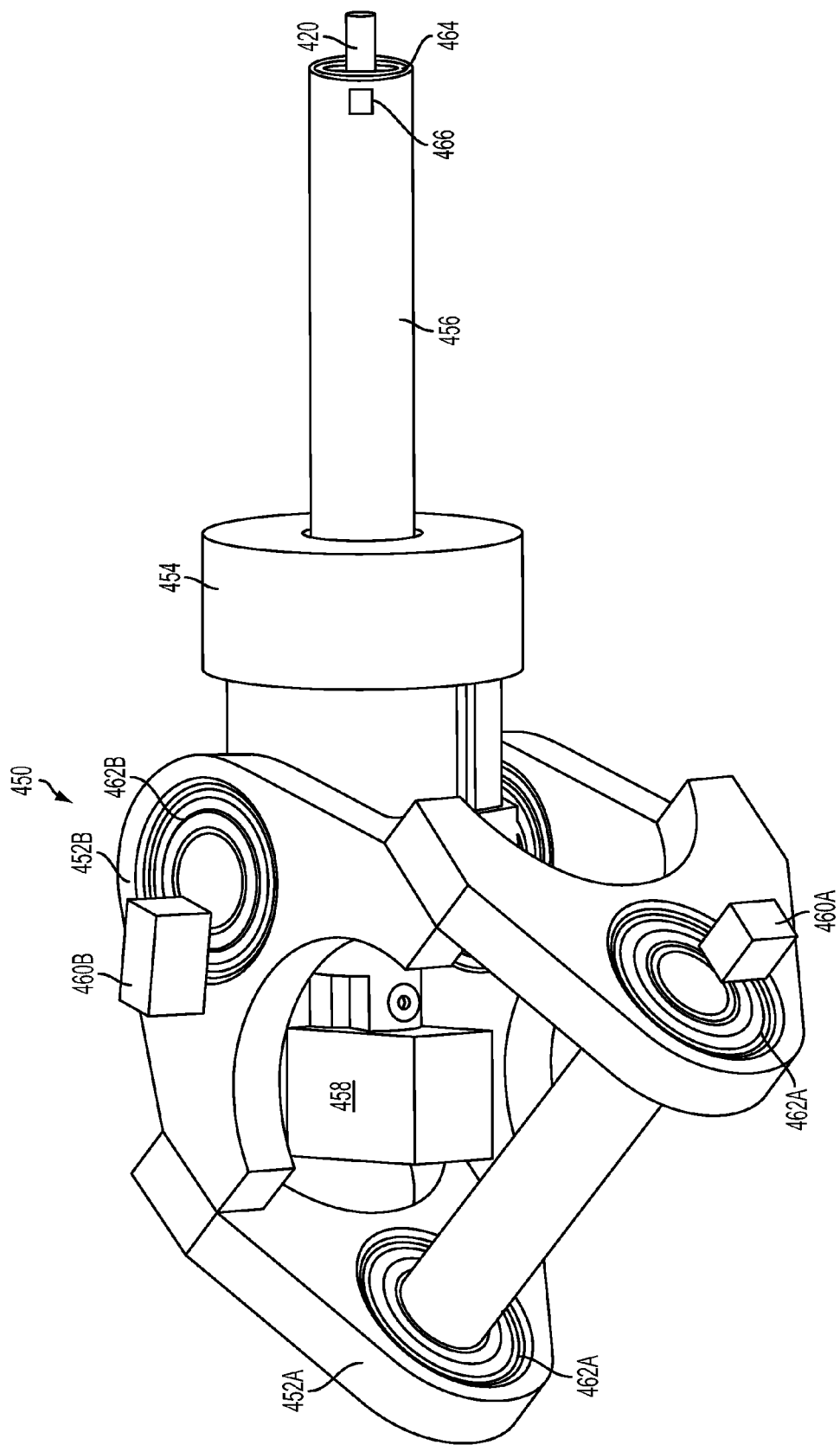
FIG. 4 illustrates a perspective view of an alternative embodiment of a tether termination mount for a ground station of an aerial vehicle of an AWT.

FIG. 4 illustrates a perspective view of an alternative embodiment of a tether termination mount for a ground station of an aerial vehicle of an AWT, such as the aerial vehicle 130 illustrated in FIG. 1. Tether termination mount 450 may be the same or similar to tether termination mount 350 of FIG. 3B. FIG. 4 is representative only and not all components are shown. For example, additional structural or restraining components may not be shown.

Tether termination mount 450 may include gimbals 452A and 452B, slip ring 454, spindle 456, drive mechanism 458, encoders 460A and 460B, gimbal bearing systems 462A and 462B, spindle bearing system 464, and spindle sensor 466. These components may operate with tether 420 and ground station in the same or a similar manner to those already described.

As described above, the tether 420 may rotate, for example, due to the cross-wind flight pattern of an aerial vehicle of an AWT. In an example embodiment, the drive mechanism 458 may actively or passively rotate a rotatable portion of the slip ring 454 and/or the spindle 456. As illustrated in FIG. 4, a drive mechanism 458 may be directly connected to the slip ring 454, or it may be coupled to the slip ring 454 through a drivetrain or other power transmission system. The drive mechanism 458 may actively rotate the rotatable portion of the slip ring 454 to follow the rotation of the tether 420. For example, the drive mechanism 458 may be a servomotor. In a further aspect, the drive mechanism 458 may passively rotate the rotatable portion of the slip ring 454 to follow the rotation of the tether 420. For example, the drive mechanism 458 may be a torsion spring that stores potential energy P from the action of a rotating tether until the potential energy P is greater than an overturning moment M required to turn the rotatable portion of the slip ring 454.

x. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A tether termination mount, comprising:
   a gimbal system, comprising:
      a first gimbal, comprising a primary bearing system and wherein the first gimbal is configured for movement substantially about a primary axis;
      a second gimbal, comprising a secondary bearing system, wherein the second gimbal is configured for movement substantially about a secondary axis, and wherein the first gimbal is coupled to the second gimbal;
   a slip ring, comprising a stationary portion and a rotatable portion, wherein the stationary portion of the slip ring is coupled to the gimbal system, wherein the stationary portion and rotatable portion are electrically coupled, and wherein the rotatable portion is electrically coupled to a tether; and
   a spindle, comprising a proximate spindle end and a distal spindle end, wherein the spindle is configured to constrain a portion of the tether, and wherein the proximate spindle end is coupled to the rotatable portion of the slip ring.

2. The spindle of claim 1, further comprising a spindle bearing system, wherein the bearing system is located at the distal spindle end, and wherein the bearing system provides a rotatable surface against which the tether may rotate relative to the spindle.

3. The apparatus of claim 1, further comprising:
   a force sensor connected to the distal spindle end, wherein the force sensor is configured to measure a tether force applied to the spindle by the tether.

4. The apparatus of claim 3, wherein the force sensor is a load cell.

5. The apparatus of claim 4, wherein the force sensor is a strain gauge.

6. The apparatus of claim 1, wherein the secondary axis is substantially perpendicular to the primary axis.

7. The apparatus of claim 1, further comprising:
   a torsion spring, comprising a proximate spring end and a distal spring end, wherein the proximate spring end is coupled to the rotatable portion of the slip ring and the distal spring end is coupled to the tether.

8. The apparatus of claim 1, further comprising:
a servomotor connected to the slip ring, wherein the servomotor is configured to rotate the rotatable portion of the slip ring in response to rotation of the tether.

9. The apparatus of claim 1, wherein the tether comprises at least one insulated electrical conductor, and wherein the at least one conductor comprises:
a proximate conductor end that terminates at the rotatable portion of the slip ring; and
a distal conductor end.

10. A tether termination mount, comprising:
a gimbal system, comprising:
a first gimbal, comprising a primary bearing system and a primary encoder, wherein the first gimbal is configured for movement substantially about a primary axis;
a second gimbal, comprising a secondary bearing system and a secondary encoder, coupled to the first gimbal, wherein the second gimbal is configured for movement substantially about a secondary axis, and wherein the first gimbal is coupled to the second gimbal;
a slip ring, comprising a stationary portion and a rotatable portion, wherein the stationary portion of the slip ring is coupled to the gimbal system, wherein the stationary portion and rotatable portion are electrically coupled, and wherein the rotatable portion is electrically coupled to a tether; and
a spindle, comprising a proximate spindle end and a distal spindle end, wherein the spindle is configured to constrain a portion of the tether, and wherein the proximate spindle end is coupled to the rotatable portion of the slip ring.

11. The apparatus of claim 10, wherein the primary encoder is configured to measure a position of the tether termination mount about a primary axis.

12. The apparatus of claim 10, wherein the primary encoder is configured to measure a velocity of the tether about a primary axis.

13. The apparatus of claim 10, wherein the secondary encoder is configured to measure a position of the tether termination mount about a secondary axis.

14. The apparatus of claim 10, wherein the secondary encoder is configured to measure a velocity of the tether termination mount about a secondary axis.

15. A system, comprising:
a tether, comprising:
a distal tether end coupled to an aerial vehicle;
at least one insulated electrical conductor coupled to the aerial vehicle;
a main tether body; and
a proximate tether end; and
a tether termination mount comprising:
a gimbal system, comprising;
an altitude axis gimbal, comprising an altitude bearing system and an altitude encoder, wherein the altitude axis gimbal is configured for movement substantially about an altitude axis;
an azimuth axis gimbal, comprising an azimuth bearing system and an azimuth encoder, coupled to the altitude axis gimbal, wherein the azimuth axis gimbal is configured for movement substantially about an azimuth axis, and wherein the altitude axis gimbal is coupled to the azimuth axis gimbal;
a slip ring, comprising a stationary portion and a rotatable portion, wherein the stationary portion of the slip ring is coupled to the gimbal system, wherein the stationary portion and rotatable portion are electrically coupled, and wherein the rotatable portion is electrically coupled to the at least one insulated electrical conductor;
a servomotor coupled to the slip ring, wherein the servomotor is configured to rotate the slip ring in response to rotation of the tether; and
a spindle, comprising a proximate spindle end and a distal spindle end, wherein the spindle is configured to constrain a portion of the main tether body, and wherein the proximate spindle end is coupled to the rotatable portion of the slip ring.

16. The spindle of claim 15, further comprising a spindle bearing system, wherein the spindle bearing system is located at the distal spindle end, and wherein the spindle bearing system provides a rotatable surface against which the main tether body may rotate relative to the spindle distal end.

17. The apparatus of claim 15, further comprising:
a force sensor connected to the distal spindle end, wherein the force sensor is configured to measure a tether force applied to the spindle by the tether.

18. The apparatus of claim 17, wherein the force sensor is a load cell.

19. The apparatus of claim 17, wherein the force sensor is a strain gauge.

20. The apparatus of claim 15, wherein the altitude axis is substantially perpendicular to the azimuth axis.

* * * * *